United States Patent [19]

Benjey et al.

[11] Patent Number: 5,404,907
[45] Date of Patent: Apr. 11, 1995

[54] WELDABLE VAPOR VENT VALVE FOR FUEL TANKS

[75] Inventors: Robert P. Benjey, Dexter; Pete Belanger, Ann Arbor, both of Mich.

[73] Assignee: G. T. Products, Inc., Ann Arbor, Mich.

[21] Appl. No.: 18,814

[22] Filed: Feb. 18, 1993

[51] Int. Cl.6 .............................................. F16K 17/36
[52] U.S. Cl. ..................................... 137/587; 137/43; 251/144
[58] Field of Search .................... 137/43, 587; 251/144

[56] References Cited

U.S. PATENT DOCUMENTS 4,413,804 11/1983 Lanius ................................. 251/144
4,779,637 10/1988 Ubaldi ..................................... 137/43
5,139,043  8/1992 Hyde ....................................... 137/43

Primary Examiner—Robert G. Nilson
Attorney, Agent, or Firm—Young, MacFarlane & Wood

[57] ABSTRACT

A weldable vapor vent valve assembly comprising a heat-resistant valve body and a weldable connector portion fastened to an upper end of the valve body for welding onto the outer surface of a polymeric fuel tank. In one embodiment the weldable connector portion is overmolded onto an upper end of the valve body, with the mechanical connection and fluid seal between the weldable connector portion in the valve body strengthened by one or more sets of circumferential anti-leak ribs on the upper end of the valve body. In another embodiment the weldable connector and the valve body are manufactured separately, and the seal and connecting means for assembling the two in a fluid- and vapor-tight manner allow the valve body to be assembled to the weldable connector in a simple axial press-fit.

17 Claims, 2 Drawing Sheets

WELDABLE VAPOR VENT VALVE FOR FUEL TANKS

FIELD OF THE INVENTION

The present invention relates to vent valves capable of being welded to polymeric automotive fuel tanks, more specifically to a weldable vapor vent valve having two portions, one of which is weldable to the fuel tank, the other of which is heat- and vapor-resistant, and means for providing a secure connection and seal between the two portions of dissimilar materials.

BACKGROUND OF THE INVENTION

A new trend in the field of automotive fuel tanks is to make the fuel tanks out of a weldable polymer material, such as polyethylene, which lends itself to efficient manufacturing processes such as blow-molding. The use of these fuel tanks is becoming widespread; however, the prior art has not yet disclosed a suitable structure for connecting fuel tank rollover and vent valves to such polymeric tanks. The materials which lend themselves to efficient manufacture of polymeric fuel tanks typically are not suitable for making quality vent valves; they are frequently too soft and are subject to long term creep problems. Moreover, the preferred method for attaching ports to polymeric fuel tanks has been to weld them, using well-known techniques such as hot plate welding. The temperatures involved in the welding process can damage valve bodies made largely or entirely out of the same material as the fuel tank. However, harder, higher-melting temperature materials such as nylon, which are suitable for use in valve bodies, are difficult if not impossible to weld to the materials used for the polymeric fuel tanks. For example, polyethylene and nylon simply do not weld very well due to their different melting temperatures and other properties.

To overcome this problem, it has been known in the prior art to use a "grommet carrier" of a material similar to or the same as that of the fuel tank. The grommet carrier is annular and welded about a pre-formed aperture in the fuel tank. The grommet carrier includes portions for engaging seal or grommet structure on a standard valve body so that the valve can be connected to the grommet carrier in a sealing fit after the carrier has been welded to the tank. A drawback with this structure is that it requires separate welding and assembly steps when mounting the valve to the fuel tank, and the connection and seal between the valve and the grommet carrier are not suitably secure. It is also more expensive to manufacture.

There is accordingly a need for a weldable vapor vent valve structure in which standard non-weldable vent valves can be efficiently and securely welded to a polymeric fuel tank.

SUMMARY OF THE INVENTION

A solution to the above-described problems is to provide a standard vent valve of suitable, heat-resistant material, for example nylon, with a weldable connector portion already attached to the valve body so that the whole structure can simply be inserted in an aperture in the fuel tank and the weldable connector welded to the fuel tank. One method for providing a weldable connector on the valve body is by overmolding a weldable connector structure onto the upper portion of the valve body.

However, certain problems are inherent in attempting to connect or mold the weldable material of the connector to the non-weldable material of the valve body. The materials used, for example polyethylene and nylon, typically do not adhere very well, resulting in a weak connection and sealing interface between the two. When the unit is assembled to a fuel tank, the result is leakage of liquid fuel and fuel vapor between the valve body and weldable connector interface. This is undesirable from a performance standpoint, and creates an unacceptable safety risk.

Therefore, the present invention provides a novel weldable vent valve structure including an efficient connection and sealing arrangement between the weldable connector and the non-weldable valve body.

In a first embodiment of the invention a standard, non-weldable vent valve includes a main valve body having a lower portion for insertion through an aperture in the fuel tank wall to extend into the fuel tank, and an upper portion positioned above the fuel tank when the valve is inserted. The vent valve itself may take any form, so long as it is designed to vent fuel vapor from the interior of the fuel tank to the atmosphere or external vapor-treating structure. For this purpose the valve is typically hollow, with suitable apertures and vapor pathways connecting the lower and upper portions of the main valve body, terminating in a vent outlet in the upper portion of the valve body. The valve can, for example, be a rollover valve, a head valve, a fill control valve, or any other known valve structure for venting fuel vapor from the tank. A weldable connector is connected to the upper portion of the valve body so that at least a portion of it is in position for welding to the fuel tank when the vent valve is operatively positioned within the fuel tank aperture. The weldable connector can surround the vent outlet structure of the upper portion of the valve body, or can itself provide an extension of the vent outlet, for example a nozzle conduit extending from the vent outlet for connection to a vapor canister.

Structure is provided on the vent valve body to seal the valve body and the weldable connector at their interface, preventing leakage of fuel and fuel vapor therebetween. In one form the seal structure may itself also aid in strengthening the connection between the weldable connector and the valve body. In another form, it simply provides a seal.

In one embodiment of the invention the weldable connector is overmolded onto the upper portion of the valve body. The seal structure on the valve body comprises a plurality of circumferential ribs on the exterior of the upper portion of the valve body. These ribs serve both to enhance the mechanical, frictional connection between the overmolded weldable connector and the upper portion of the valve body, and further provide a circuitous, labyrinth-type flow-restricting interface between the weldable connector and the valve body to prevent leakage of fuel and fuel vapor therebetween.

In a preferred form of the overmolded valve with anti-leak ribs, two sets of ribs are provided to create a double labyrinth. The different sets of ribs can vary in size and number to define a first coarse labyrinth which provides a particularly strong connection between the overmolded weldable connector and the valve body, and a finer, second labyrinth which provides a more effective anti-leak seal between the two. In one particular embodiment the two sets of anti-leak ribs are disposed at right angles to each other on the valve body.

In another embodiment of the invention the weldable connector is formed or molded separately from the valve body and subsequently assembled therewith. To facilitate assembly, the upper portion of the valve body defining the vent outlet includes an axial plug portion which can be axially assembled to a mating recess formed in the weldable connector. The plug portion is provided with seal means which sealingly engage the interface between the upper portion of the valve body and the weldable connector. Separate connection means are provided to lock the weldable connector physically to the valve body, for example heat stakes or snap-fit structure. In this embodiment the weldable connector itself defines the final nozzle conduit or outlet of the assembled valve.

The seal means on the plug portion of the valve body in one embodiment comprises an O-ring or similar compressible external seal structure which frictionally and sealingly engages the walls of the weldable connector when the plug portion is inserted.

In the embodiment in which the weldable connector is manufactured separately from the valve body, and subsequently assembled thereto, the need for overmolding and rib structure is eliminated. This embodiment is particularly economical to manufacture and assemble, and provides positive and independent seal and connection functions.

These and other advantages of the present invention will become apparent upon further reading of the specification.

BRIEF DESCRIPTION OF THE ILLUSTRATED EMBODIMENTS

DETAILED DESCRIPTION OF THE ILLUSTRATED EMBODIMENTS

Figure 1:
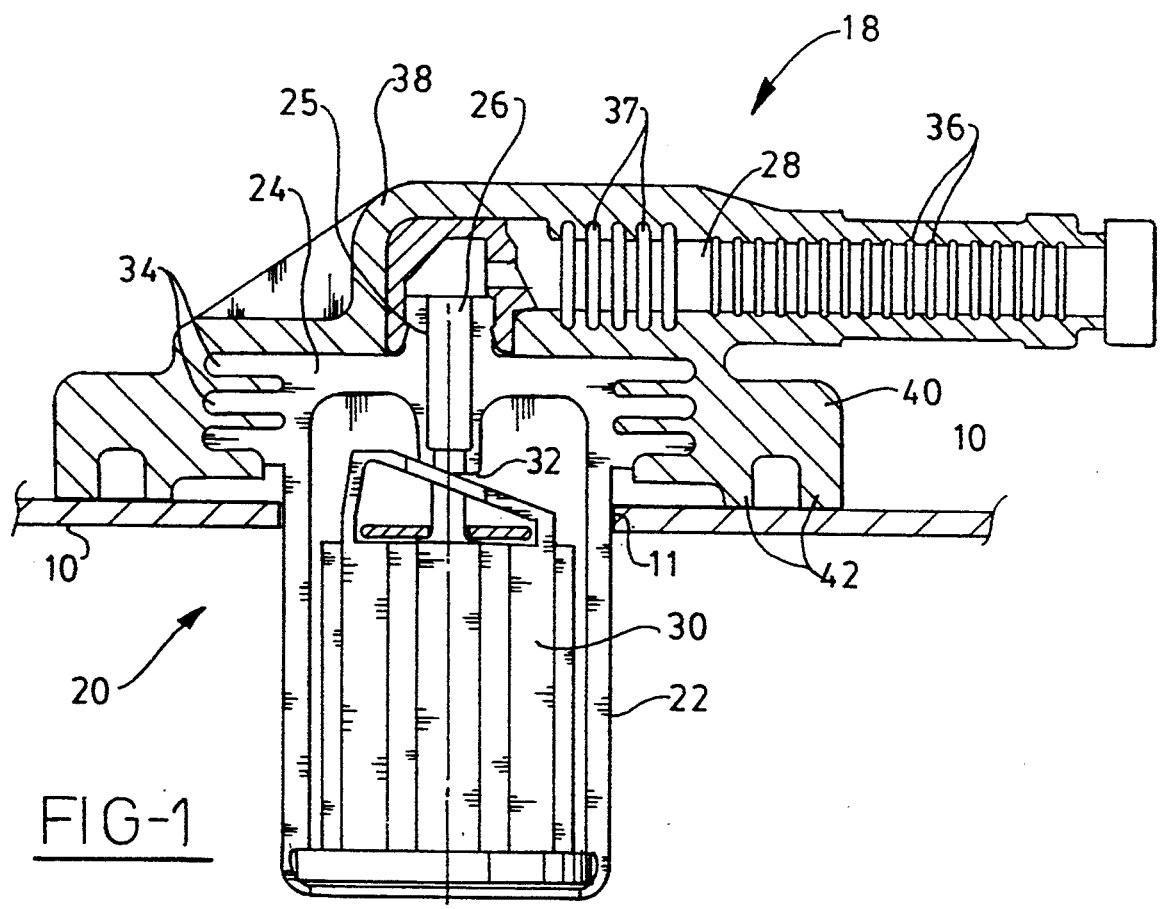
FIG. 1 is a side section view of an overmolded vent valve and weldable connector structure according to the present invention connected to a fuel tank.

Referring first to FIG. 1, a weldable vapor vent valve assembly 18 according to the present invention is shown comprising a heat-resistant main valve body 20 having a cylindrical lower portion 22 inserted through aperture 11 in fuel tank wall 10, and an upper portion 24 extending above fuel tank wall 10. Valve body 20 can be formed of any suitable polymer material, so long as it is sufficiently heat-resistant to withstand the temperatures involved in welding techniques such as hot-plate welding.

Fuel tank wall 10 comprises a polymer of the type which lends itself to blow-molding, for example polyethylene. Although in the illustrated embodiment tank wall 10 comprises polyethylene, and valve body 20 comprises a nylon material, it will be understood by those skilled in the art that other materials can be used. The important thing is that valve body 20 is capable of withstanding the welding environment temperatures generated in fastening assembly 18 to the softer, lower melting temperature fuel tank 10.

Nylon valve body 20 generally defines a vent outlet 26 in upper portion 24, communicating with the hollow interior of lower portion 22 and with nozzle conduit 28 extending at right angles from upper portion 24. In the illustration of FIG. 1, nozzle conduit 28 is formed separately from valve body 20 and subsequently assembled thereto in a snap-fit described below. Nozzle conduit 28 and valve body 20 can, however, be integrally formed if desired. Valve structure 30, for example rollover shut off structure such as that shown in co-pending U.S. Ser. No. 974,655, is responsive to various factors in the fuel tank to selectively open and close valve seat 32.

Upper portion 24 of valve body 20 is provided with a first set of circumferential anti-leak ribs 34. Nozzle conduit 28 is provided with a second set of anti-leak ribs 36 for a purpose to be hereinafter described. Ribs 36, like ribs 34, are circumferential.

A weldable connector 38 formed from a material which can be welded to fuel tank wall 10, in the illustrated embodiment polyethylene, is overmolded around the entire upper portion 24 of valve body 20. Although the method of overmolding polymeric bodies is generally known, the specific method for overmolding weldable connector 38 on upper portion 24 of valve body 20 is new. A five part mold structure (not shown) is used comprising a two-part top clamp shell portion which molds the polyethylene over the upper portion 24 of the valve body. At the same time, a single, cylindrical lower mold surrounds the lower portion 22 of valve body 20, while two insert/support mold sections are used to reinforce hollow lower portion 22 of valve body 20 and nozzle conduit 28 by inserting them therein to provide both support and a seal for valve body 20 so that polyethylene does not leak around the seams and so that valve body 20 is not crushed by the pressure.

It can be seen from FIG. 1 that overmolded weldable connector 38 essentially coats or covers the entire surface of upper portion 24 of valve body 20. In particular, it flows between and around the first and second sets of ribs 34,36, which upon hardening of weldable connector 38 serve to frictionally or mechanically lock weldable connector 38 to upper portion 24 of valve body 20. The right-angle offset of ribs 34,36 enhances this locking function. This is especially important in view of the poor qualities of adherence between polyethylene and nylon.

Additionally, the difference in thermal expansion between the polyethylene in weldable connector 38 and the nylon valve body serves to improve the seal between ribs 34,36 and the weldable connector. As the environment heats up during operation of the engine, the polyethylene expands more rapidly, tightening the fit between connector and ribs and improving the seal at their interface.

Weldable connector 38 includes a welding flange 40 comprising one or more feet or contacts 42. Welding contacts 42 contact fuel tank wall 10 when valve 18 is properly seated within aperture 11. They are then welded to the polyethylene tank wall 10 using suitable known techniques such as hot plate welding.

Once valve 18 has been welded to fuel tank 10, valve body 20 and its associated valve structure 30 are operatively fastened to fuel tank 10 in a secure, fluid- and vapor-tight manner. Specifically, weldable connector 38 is effectively integrated into fuel tank wall 10 by the welding process. The locking connection between the sets of ribs 34,36 on nylon valve body upper portion 24 of the nylon valve body 20 securely lock valve body 20 to the weldable connector 38, and thus to the fuel tank. Moreover, ribs 34 and 36 provide a circuitous, double-labyrinth, flow-restricting interface between valve body 20 and weldable connector 38.

Fuel leakage between lower portion 22 of valve body 20 and aperture 11 of fuel tank wall 10 cannot bypass the welded contact points 42, which are effectively part of the fuel tank wall. The circuitous, tightly-conforming interface between weldable connector 38 and ribs 34 provides a first barrier to fluid and vapor leakage. Should any fuel bypass the first set of ribs 34, second set of ribs 36, which are smaller and more numerous, provide a second, virtually leak-proof barrier.

If desired, additional sets of anti-leak ribs such as shown at 37 could be added along nozzle conduit 28 or upper portion 24 of valve body 20.

In the embodiment of FIG. 1, where nylon valve body 20 is formed in two parts, upper portion 24 of nylon valve body 20 ends in a cylindrical plug portion 25 defining vent outlet 26, while nozzle conduit 28 is manufactured separately and fitted to plug 25 in a snap-fit or other suitable locking connection.

Figure 2:
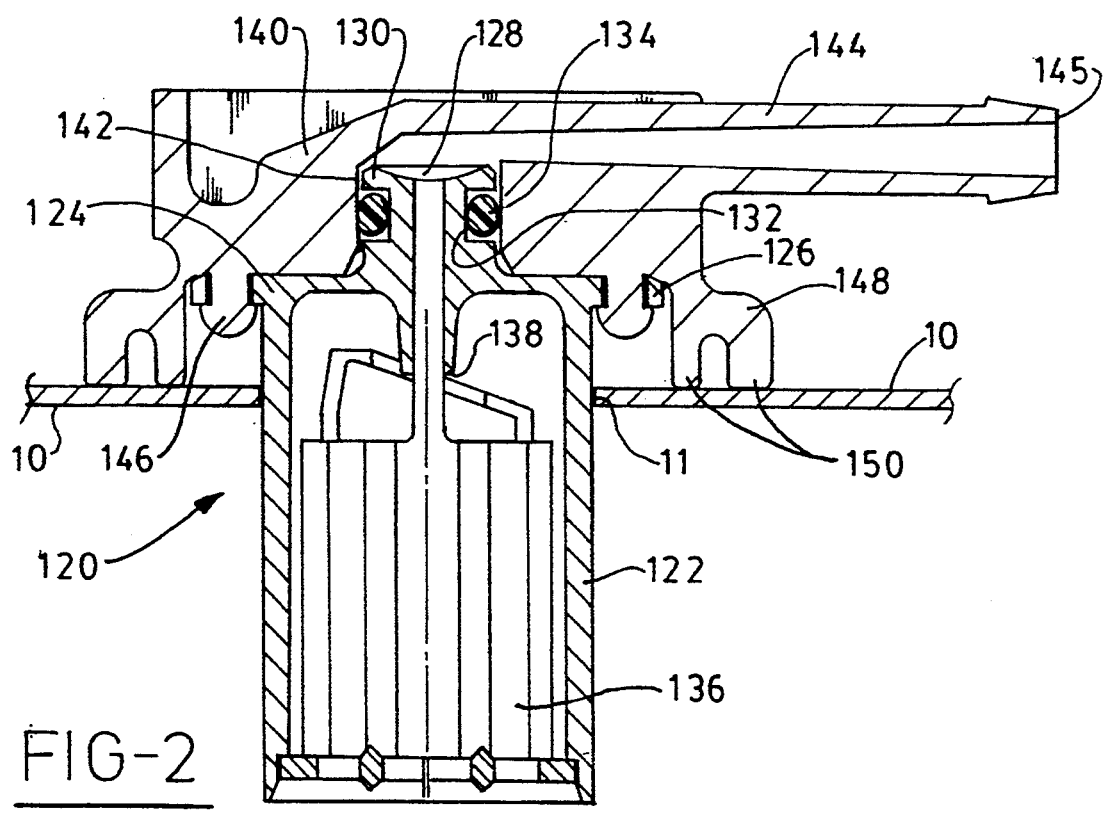
FIG. 2 is another embodiment of a weldable valve according to the present invention where the valve body and the weldable connector are formed separately and subsequently assembled.

Referring now to FIG. 2, an improved valve assembly 118 is shown in which nylon valve body 120 and weldable connector 140 are manufactured separately, rather than overmolded, to both reduce cost and provide more flexibility in terms of the adaptability of connector 140 to standardized nylon valve bodies 120. It is also easier to assemble.

Nylon valve body 120 still has a lower portion 122 extending through aperture 11 in tank wall 10 to the interior of the fuel tank, and an upper portion 124 extending above fuel tank wall 10. Upper portion 124 includes connecting structure 126 outboard of the valve body itself, for example in the illustrated embodiment apertures for accepting heat stake posts 146 as described below.

Upper portion 124 of valve body 120 terminates in a vent outlet 128 defined in part by an insertion plug portion 130. A circumferential groove or channel 132 is formed in plug 130 to matingly receive an O-ring seal 134. The depth of channel 132 is less than the thickness of O-ring 134, such that O-ring 134 protrudes from the outer surface of plug 130.

Valve structure 136 and its associated valve seat 138 connected with vent outlet 128 is essentially the same as that shown in FIG. 1. Of course, virtually any type of vapor vent valve operating structure can be used within lower portion 122. One of the advantages of the present invention is that standard or standardized rollover and vent valves can be easily adapted for welding to polymeric fuel tanks.

Weldable connector 140 in FIG. 2 is molded or otherwise manufactured separately from valve body 120, generally defining a vent outlet recess 142, a nozzle conduit 144 ending in a barbed nozzle outlet 145, and connector structure 146, in the illustrated embodiment heat stake posts for heat-staking to connector structure 126 on valve body 120. Weldable connector portion 140 also includes a weld flange 148 having one or more circumferential weld feet or contacts 150 for welding to the fuel tank in the manner above described in reference to FIG. 1.

Nylon valve body 120 and weldable connector 140 are easily assembled by axial insertion of plug portion 130 into vent outlet recess 142. O-ring 132 deforms in well-known manner to effect a liquid- and vapor-tight seal with the wall of recess 142 to prevent leakage between valve body 120 and weldable connector 140.

As plug portion 130 is inserted into recess 142, connecting structure 126 on valve body 120 and connecting structure 146 on weldable connector 140 are also axially engaged in a heat-stake, snap-fit, or other suitably secure connection.

Once assembled, valve 118 is a secure, vapor-tight unit which is then easily inserted into fuel tank aperture 11 and welded to tank wall 10. Once welded to the fuel tank, O-ring 132 provides a fluid-tight seal at the interface of valve body plug 130 and weldable connector recess 142.

The embodiment of FIG. 2 lends itself particularly well to use where it is desired to have a right-angled nozzle conduit 144. This 90° angle in the vapor flowpath from the interior of the fuel tank through valve 120 and out connector 140 is often preferred due to its low profile on the exterior of the fuel tank.

Figure 3:
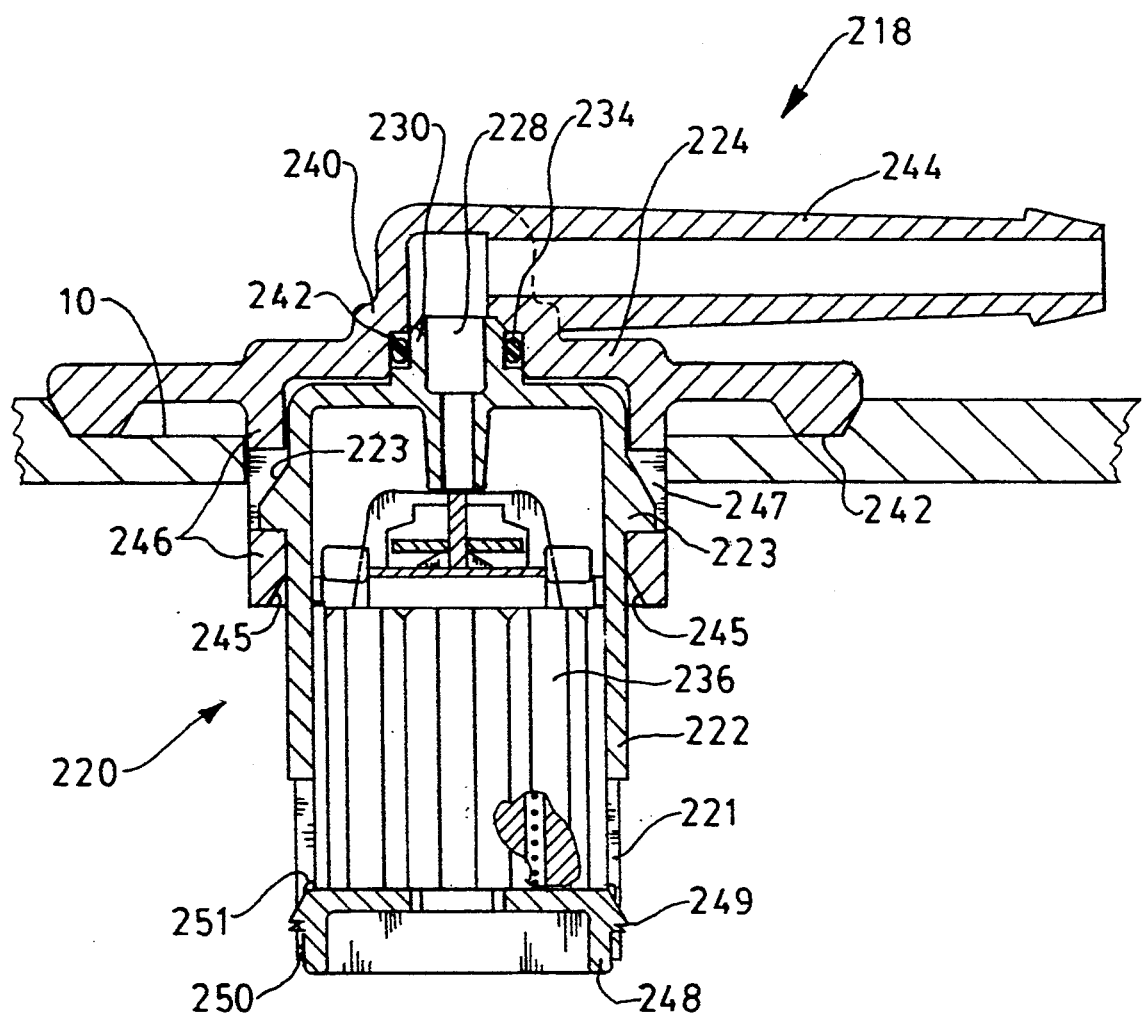
FIG. 3 is an improved version of the valve assembly of FIG. 2 with an improved mechanical connection between the valve body and the weldable connector.

Referring now to FIG. 3, a modified version of the valve assembly in FIG. 2 is shown generally at 218. The structure of nylon valve body 120 is generally the same, except that lower portion 222 is altered with large radial vents 221 and beveled connector flange 223.

The primary changes in the FIG. 3 embodiment are to weldable connector 240, whose upper structure (recess 242, nozzle conduit 244) are essentially the same. In the FIG. 3 embodiment, however, connecting structure 126 and 146 from FIG. 2 has been replaced by a partial sleeve 246 integral with weldable connector 240 and surrounding a portion of valve body 220 within the fuel tank. Also, weld feet or connectors 142 have been eliminated in favor of a solid welding lug or bead 242.

Sleeve 246 is open at its lower end to permit axial insertion of nylon valve body 220 in the manner of the FIG. 2 embodiment. Axial insertion of nylon valve body 220 into sleeve 246 forces beveled connector flanges 223 over beveled lip surfaces 245 and up into recesses 247 in a snap-fit, aided by the somewhat resilient nature of the sleeve 246. The flat lower abutment surfaces of connector flanges 223 prevent withdrawal of the nylon valve body from sleeve 246.

An end plate 248 is snapped or otherwise fastened at the lower end of nylon valve body 220 to secure the rollover structure 236 within lower portion 222. In the illustrated embodiment end plate 248 is provided with beveled connectors 249 which are forced over lip 250 into radial vents 221. The upward limit of travel for plate 248 is defined by a small circumferential stop or shoulder 251 in lower portion 222.

As in the FIG. 2 embodiment, nylon valve body 120 and weldable connector 240 are manufactured separately and subsequently assembled in a simple, axial press-fit.

The foregoing description sets forth a number of illustrative embodiments of the present invention, and is not intended to be limiting, as many modifications and variations of the basic concepts will lie within the scope of the appended claims.

We claim:

1. A weldable vent valve for welding to a polymeric fuel tank, the valve comprising:

a main valve body of a non-weldable material, the main valve body having a lower portion extending into the fuel tank through an aperture, and an upper portion extending above the fuel tank to define a valve vent outlet, the valve body defining a vapor flow path from the interior to the exterior of the fuel tank;

a weldable connector portion connected to the upper portion of the main valve body, the weldable connector portion comprising a weldable material suitable for welding to the fuel tank, at least a portion of the weldable connector contacting the wall of the fuel tank for welding to the fuel tank when the main valve body is operatively positioned in the aperture; and seal means on the main valve body for providing a seal at an interface of the upper portion of the main valve body and the weldable connector, the seal means comprising a plurality of circumferential ribs on the upper portion of the main valve body, the ribs embedded in the weldable connector portion to define a circuitous, substantially liquid- and vapor-tight barrier between the upper portion of the main valve body and the weldable connector, the upper portion of the main valve body provided with two sets of anti-leak ribs spaced along the vapor flowpath through the main valve body.

2. A valve as defined in claim 1, wherein the two sets of anti-leak ribs comprise a first upstream set of ribs of greater diameter and thickness and a second, downstream set of ribs of lesser diameter and thickness.

3. A vent valve as defined in claim 1, wherein the upper portion of the main valve body comprises an outlet portion coaxial with the main valve body, and a nozzle portion connected to the outlet portion and extending at right angles from the main valve body.

4. A valve as defined in claim 3, wherein a first set of anti-leak ribs is positioned on the outlet portion, and a second set is positioned on the nozzle portion, such that said first and second sets of ribs are disposed essentially at right angles to each other along the vapor flow path.

5. A valve as defined in claim 3, wherein the main valve body is an integral, one-piece unit.

6. A weldable vent valve for welding to a polymeric automotive fuel tank, the valve comprising:

a main valve body of a non-weldable material having a lower portion extending into the interior of the fuel tank through an aperture in the fuel tank wall, and an upper portion defining a valve vent outlet extending above the fuel tank when the main valve body is so positioned;

a weldable connector formed separately from the main valve body, the weldable connector including axial assembly means to subsequently axially connect the upper portion of the main valve body to the weldable connector, the weldable connector further defining a connector/valve interface portion mating with the upper portion of the valve body when the main valve body and the weldable connector are assembled, and a nozzle outlet in vapor communication with the valve vent outlet when assembled therewith, a portion of the weldable connector contacting the fuel tank wall when the main valve body is operatively positioned in the fuel tank aperture; and seal means on the upper portion of the main valve body for providing a seal at the connector/valve interface when the main valve body and the weldable connector are assembled.

7. A valve as defined in claim 6, wherein the assembly means comprise heat stake portions on the weldable connector for connection to suitable apertures in the upper portion of the main valve body.

8. A valve as defined in claim 6, wherein the assembly means include a sleeve portion integral with the weldable connector, the sleeve portion surrounding at least a portion of the lower portion of the main valve body when the weldable connector and main valve body are assembled, the sleeve portion having an open axial end to permit axial insertion of the main valve body, the sleeve portion including means interacting with the main valve body to axially lock the main valve body to the weldable connector in the assembled position.

9. A weldable vent valve for welding to a polymeric automotive fuel tank, the valve comprising:

a main valve body of a non-weldable material having a lower portion extending into the interior of the fuel tank through an aperture in the fuel tank wall, and an upper portion defining a valve vent outlet extending above the fuel tank when the main valve body is so positioned;

a separate weldable connector including axial assembly means to axially connect the upper portion of the main valve body to the weldable connector, the weldable connector further defining a connector/valve interface portion mating with the upper portion of the valve body, and a nozzle outlet in vapor communication with the valve vent outlet when assembled therewith, a portion of the weldable connector in contact with the fuel tank wall when the main valve body is operatively positioned in the fuel tank aperture; and seal means on the upper portion of the main valve body for providing a seal at the connector/valve interface when the main valve body and the weldable connector are assembled, wherein the upper portion of the main valve body includes a plug portion supporting the seal means, the plug portion inserted with the connector/valve interface portion of the weldable connector in axial fashion for sealing engagement therewith.

10. A weldable vent valve for welding to a polymeric automotive fuel tank, the valve comprising:

a main valve body of a non-weldable material having a lower portion extending into the interior of the fuel tank through an aperture in the fuel tank wall, and an upper portion including a valve vent outlet extending above the fuel tank when the main valve body is so positioned;

a weldable connector formed separately from the main valve body, the weldable connector defining a connector/valve interface portion for axially mating with the upper portion of the valve body when the main valve body and the weldable connector are assembled, and a nozzle outlet in vapor communication with the valve vent outlet when assembled therewith, a portion of the weldable connector in contact with the fuel tank wall when the main valve body is assembled therewith and operatively positioned in the fuel tank aperture; and seal means on the upper portion of the main valve body, the seal means sealingly engaging the weldable connector at the connector/valve interface when the main valve body and the weldable connector are axially assembled.

11. A valve as defined in claim 10, wherein the upper portion of the main valve body includes a cylindrical seal-carrying portion which is inserted into a mating connector/valve interface portion of the weldable connector in axial fashion for sealing engagement therewith.

12. Apparatus as defined in claim 11, wherein the seal means comprise an O-ring slidingly engaging the connector/valve interface on the weldable connector when the main valve body is axially assembled with the weldable connector.

13. Apparatus as defined in claim 11, wherein the seal-carrying portion of the upper valve body comprises a cylindrical plug portion extending from the upper portion to mate with the connector/valve interface when inserted therein.

14. Apparatus as defined in claim 10, wherein the weldable connector and the main valve body are provided with mating axial connecting means to axially connect the valve body to the weldable connector upon their being assembled in sealing fashion.

15. Apparatus as defined in claim 14, wherein the axial connecting means are radially spaced from the seal means.

16. Apparatus as defined in claim 14, wherein the axial connecting means comprise mating snap-fit portions formed on the main valve body and weldable connector.

17. Apparatus as defined in claim 14, wherein the axial connecting means comprise axially connected, mating heat stake means on the main valve body and the weldable connector.

* * * * *